United States Patent [19]

Grick

[11] Patent Number: 4,596,056
[45] Date of Patent: Jun. 24, 1986

[54] HELMET SHELL FABRIC LAYER AND METHOD OF MAKING THE SAME

[75] Inventor: Shelly J. Grick, Houston, Tex.

[73] Assignee: Gentex Corporation, Carbondale, Pa.

[21] Appl. No.: 468,157

[22] Filed: Feb. 22, 1983

[51] Int. Cl.[4] .................................................. A42B 3/00
[52] U.S. Cl. .............................................. 2/412; 2/6; 2/2.5
[58] Field of Search ................... 2/411, 412, 425, 424, 2/423, 2.5, 6, 192, 200, 410

[56] References Cited

U.S. PATENT DOCUMENTS

| | | | |
|---|---|---|---|
| 241,149 | 5/1881 | Northrup | 2/195 |
| 1,624,727 | 4/1927 | Goldberg | 2/195 X |
| 2,264,594 | 12/1941 | Schuessler | 2/195 |
| 2,532,442 | 12/1950 | Daly | 2/412 |
| 2,610,322 | 9/1952 | Daly | 2/412 |
| 2,682,668 | 7/1954 | Hoeflich | 2/200 X |
| 3,551,911 | 1/1971 | Holden | 2/411 |
| 3,582,990 | 6/1971 | Frieder | 2/6 |
| 4,300,242 | 11/1981 | Nava et al. | 2/412 |

FOREIGN PATENT DOCUMENTS

| | | | |
|---|---|---|---|
| 1080770 | 4/1960 | Fed. Rep. of Germany . | |
| 0847337 | 6/1939 | France | 2/200 |
| 2421361 | 10/1979 | France | 2/412 |
| 2501851 | 9/1982 | France | 2/410 |
| 0404711 | 6/1943 | Italy | 2/6 |
| 287270 | 3/1928 | United Kingdom . | |

Primary Examiner—Peter Nerbun
Attorney, Agent, or Firm—Shenier & O'Connor

[57] ABSTRACT

A ballistic helmet shell layer in which a plurality of identical fabric segments, each formed with a pointed end and an arcuate end on the locus of a circle having its center at the pointed end, first are laid flat with portions of the edges extending from the pointed ends of adjacent segments butting. After the segments are secured to each other adjacent to the pointed ends, the assembly is formed to a generally hemispherical shape with the remaining side edge portions of adjacent segments coming into butting relationship with only the arcuate edges free.

16 Claims, 8 Drawing Figures

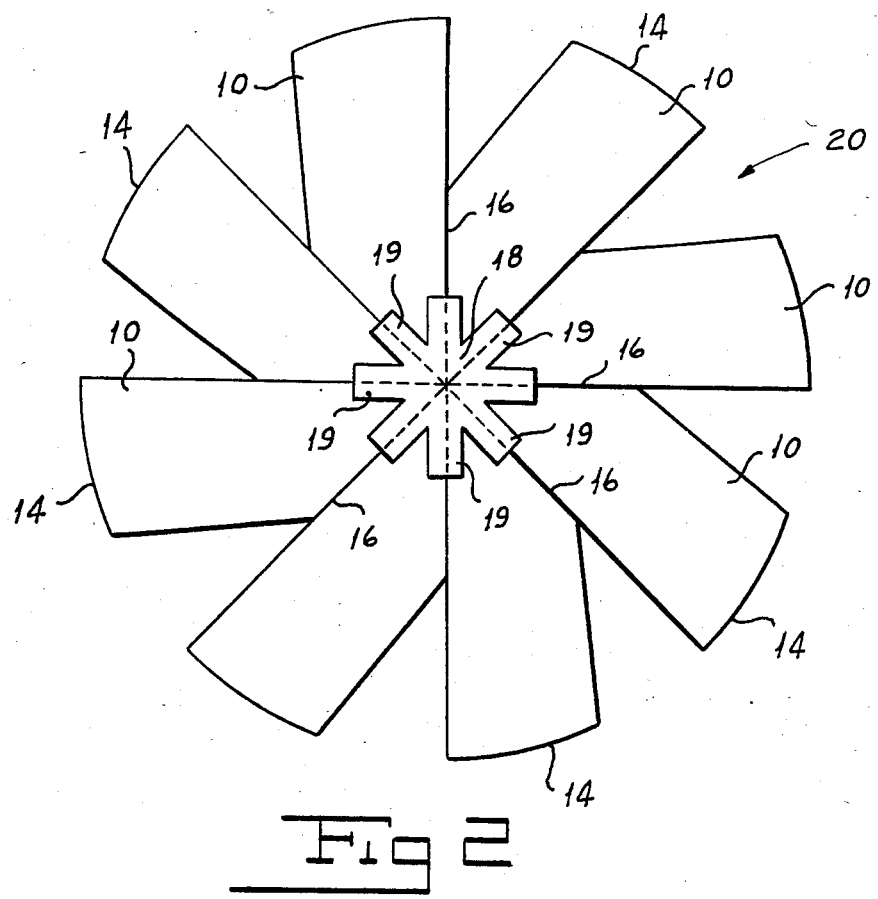
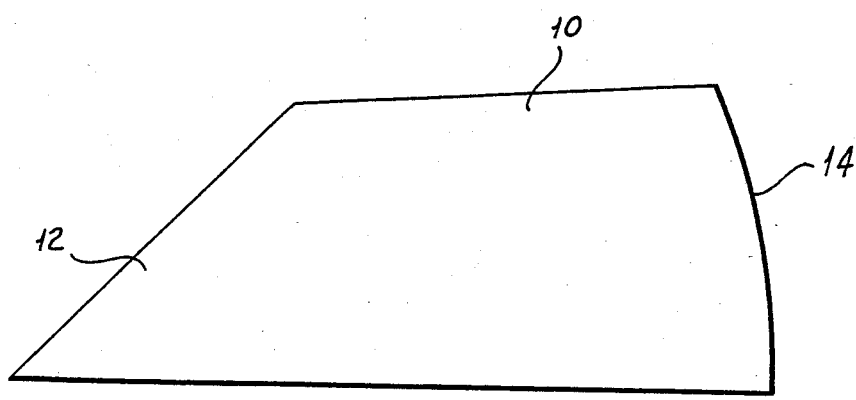

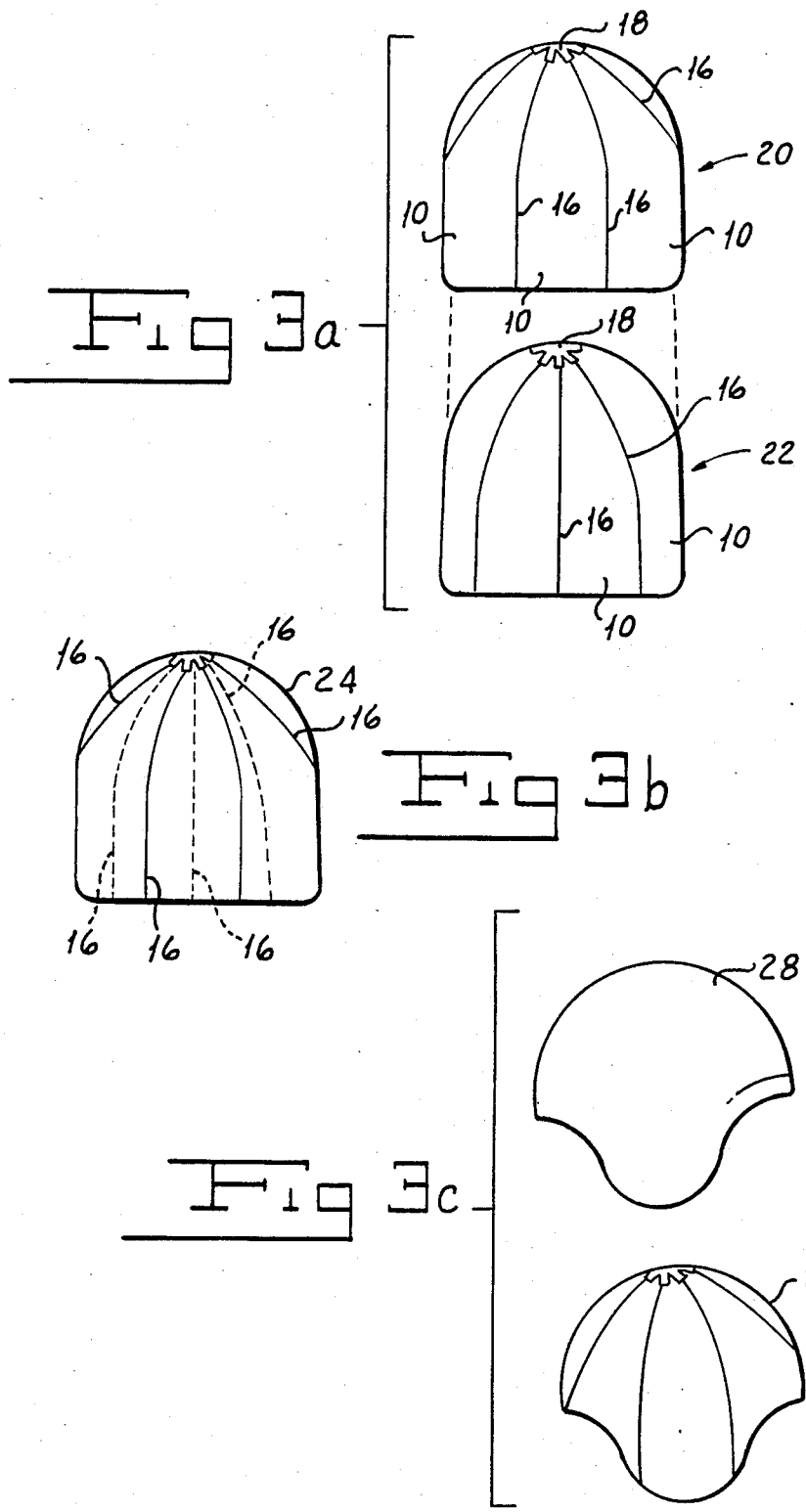

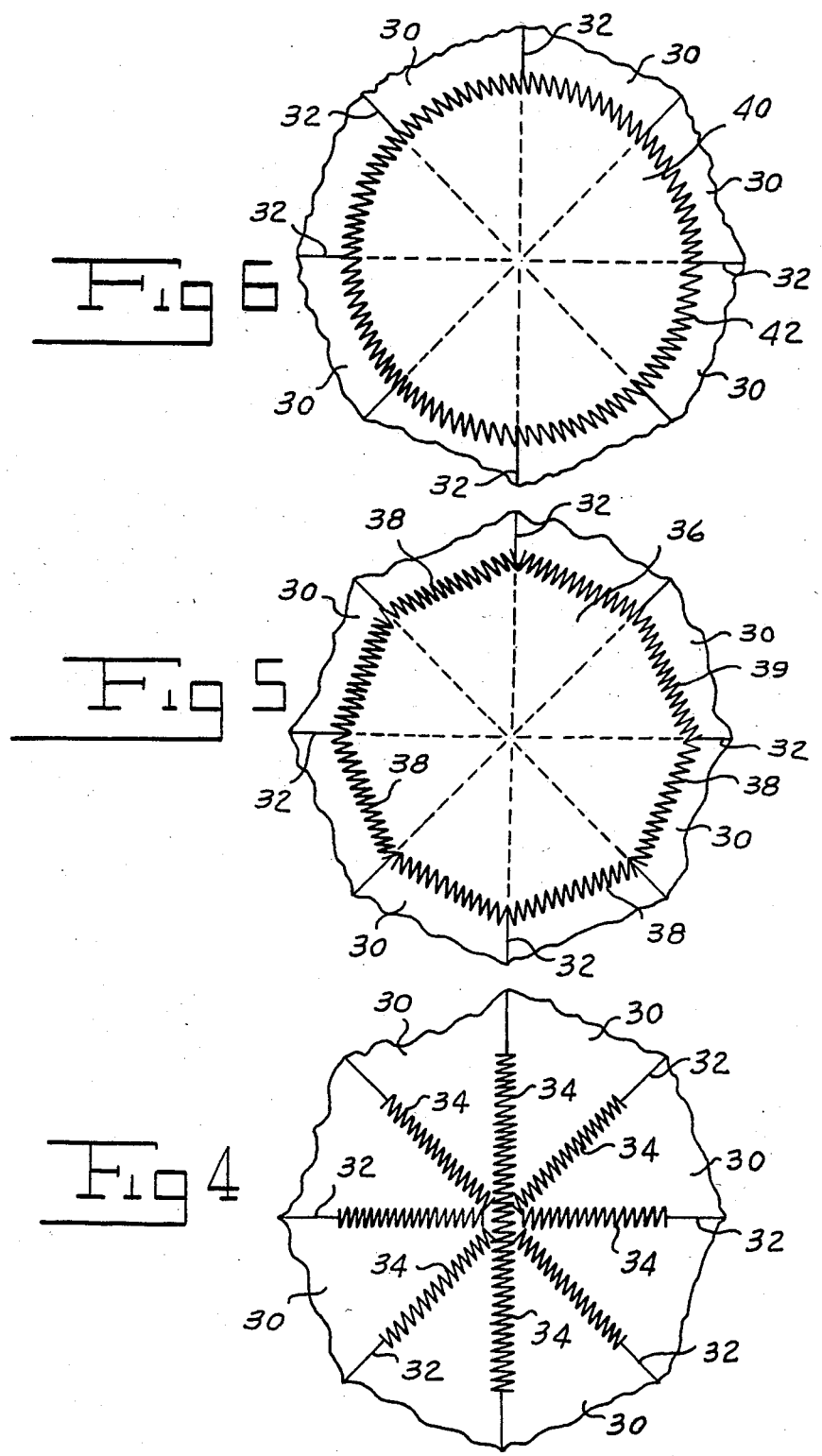

HELMET SHELL FABRIC LAYER AND METHOD OF MAKING THE SAME

BACKGROUND OF THE INVENTION

Ballistic protective combat helmet shells are formed from several layers of impregnated fabric each having a hemispherical shape. The layers are then compiled and compression molded to form the untrimmed helmet shell. Each fabric layer is formed from various fabric segments which may be taped, glued, or sewn together.

French Publication Girard No. 2,421,361 discloses one such method for forming the individual fabric layers in which a plurality of U-shaped fabric segments and a circular crown piece are tailored together edge to edge to obtain the hollow helmet form. While this system reduces the amount of fabric required to form one liner, it employs fabric segments of different shapes, including a circular crown piece, and considerable overlapping of the fabric segments.

SUMMARY OF THE INVENTION

One object of my invention is to provide an improved helmet shell fabric layer patterning technique which substantially reduces the amount of fabric needed to make one helmet shell.

Another object of my invention is to provide an improved helmet shell fabric layer patterning technique in which each fabric layer is formed from individual fabric segments identical in shape and size.

Still another object of my invention is to provide an improved helmet shell fabric layer patterning technique in which there is virtually no overlapping of the individual fabric segments used to form each fabric layer.

A further object of my invention is to provide a simplified method of forming the individual fabric layers used to make the helmet shell of a ballistic combat helmet.

Other and further objects of my invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 1 is a plan view of a single fabric segment, a plurality of which are used to form a single fabric layer in accordance with my invention.

FIG. 2 is a plan view of a single fabric layer, made in accordance with my invention, reduced in size.

FIGS. 3a to 3c illustrate the steps performed in making a ballistic protective helmet shell constructed pursuant to my invention.

FIG. 4 is a plan view of a single fabric layer, reduced in size, illustrating an alternate and preferred embodiment of my invention.

FIG. 5 is a plan view of a single fabric layer, reduced in size, illustrating another alternate and preferred embodiment of my invention.

FIG. 6 is a plan view of a single fabric layer, reduced in size, illustrating still another alternate and preferred embodiment of my invention.

DESCRIPTION OF THE PREFERRED EMBODIMENT

Referring now to FIGS. 1 and 2, my helmet shell fabric layer patterning technique includes a plurality of identical fabric segments or petals 10 each having a pointed end 12 and a blunt end 14. In addition, each petal is cut from fabric pre-impregnated with phenolic resin and otherwise suitable for use in a ballistic protective combat helmet shell. I place the petals in a pinwheel configuration with the pointed ends 12 of the petals in the center and with the ends 14 lying in the locus of a circle with portions of the edges butting along lines 16.

In one form of my invention I cut a piece 18 of heat sensitive tape with a plurality of radially outwardly extending arms 19. I place the piece 18 over the center of the pinwheel pattern with the arms 19 in alignment with the lines 16. Sufficient heat is applied to adhere the tape to the petals, thus forming a single fabric layer, indicated generally by the reference character 20, which is easily molded to generally hemispherical shape. It is to be noted that, as the layer is formed to the desired hemispherical shape adjacent segments butt along their entire edges from top to bottom, leaving free only the lower edges 14. That is, with the layer formed to hemispherical shape the lines 16 along which adjacent segment edges butt continue from top to bottom with substantially no overlapping of material.

Referring now to FIG. 3, at least one other fabric layer, indicated generally by the reference character 22, formed in the same manner as layer 20, is then inserted within the first layer 20. The disposition of the petals 10 within the layers 20 and 22 is such that the lines 16 of layer 20 are out of alignment with the lines 16 in layer 22. This orientation of layer 20 with respect to layer 22 minimizes lines of weakness in the helmet. Layers 20 and 22 are then compression molded to form the untrimmed helmet shell 24. The untrimmed shell 24 is then cut to the shape of a helmet 26, providing protection for the ears of the wearer, and secured to the inside of the outer helmet shell 28. It will be readily appreciated that a plurality of layers 20 may be similarly compiled and compression molded to form the untrimmed helmet shell 24.

The use of the individually patterned petals 10, joined with a tape piece 18 to form a fabric layer pinwheel 20, results in a saving of approximately one yard of fabric together with minimal waste, for the manufacture of one ballistic combat helmet shell.

Referring now to FIGS. 4, 5 and 6, alternate and preferred embodiments of my invention include a plurality of identical fabric segments or petals 30 each having a pointed end and an arcuate end, and each cut from a fabric suitable for use in a ballistic protective combat helmet shell. I place the petals 30 in a pinwheel configuration with the pointed ends of the petals in the center with the edges of adjacent segments butting along lines 32.

In the embodiment of my invention shown in FIG. 4, the petals 30 are secured to each other and formed into a single fabric layer by the use of double throw zig-zag stitching 34 along a portion of each of the lines 32.

In the embodiment of my invention shown in FIG. 5, the petals 30 are joined into a single fabric layer by the use of an octogonally shaped crownpiece 36 placed over the center of the pinwheel pattern and extending over a portion of each line 32. Each side 38 of the crownpiece 36 is attached to a separate petal 30 by stitching 39, to form a single fabric layer.

In the embodiment of my invention shown in FIG. 6, a circular crownpiece 40 is placed over the center of the pinwheel pattern and over a portion of each line 32. The circumference of the crownpiece is secured to the petals 30 by stitching 42, to form a single fabric layer used in the formation of an untrimmed helmet shell as described above.

It will be seen that I have accomplished the objects of my invention. I have provided an improved helmet shell fabric layer patterning technique which substantially reduces the amount of fabric needed to make one helmet shell. My technique utilizes individual identical fabric segments to form each fabric layer and requires virtually no overlapping of the fabric segments.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A protective helmet layer including in combination a plurality of elongated protective fabric segments, each of said segments having a point at one end, a remote edge at the other end, and side edges extending between said point and said remote edge, said segments being arranged with their points together in a pinwheel configuration, the outline of said segments being such that when arranged flat in said configuration the side edges of adjacent segments abut over a first portion of their length adjacent to said points and diverge from each other over a second portion of their length remote from said points; and means for securing said abutting portions of said segments to each other.

2. A protective helmet layer as in claim 1 in which said securing means comprises stitching extending along said abutting side edges for a portion of the length thereof from said points.

3. A protective helmet layer as in claim 1 in which said securing means comprises an auxiliary piece of material covering said points and means for stitching said piece to each of said segments.

4. A protective helmet layer as in claim 1 in which said securing means comprises a circular piece of material covering said points and stitching extending around the edge of said piece for securing said piece to said segments.

5. A protective helmet layer as in claim 1 in which said securing means comprises a polygonal piece of material covering said points, said piece having as many sides as there are segments covering said points and stitching around the edge of said piece for securing the piece to said segments.

6. An assembly as in claim 1 in which said layer is a first layer, said assembly including a second layer formed in the same manner as said first layer, said second layer being disposed within said first layer with the side edges of the segments of said first layer out of alignment with the side edges of the segments of said second layer.

7. A protective helmet layer as in claim 1 in which the side edges of each of said segments extend generally parallel to each other over said second portion of their length.

8. A protective helmet layer as in claim 1 in which the remote edge of each of said segments is an arcuate edge.

9. A protective helmet layer as in claim 1 in which said segments are identical segments.

10. A protective helmet layer as in claim 1 in which said fabric segments are impregnated with resin.

11. A method of making a protective helmet layer including the steps of providing a plurality of elongated segments of protective fabric with each segment having a point at one end, a remote edge at the other end, and side edges extending between said points and said remote edge; arranging said segments with their points together in a pinwheel configuration, the outline of said segments being such that when arranged flat in said configuration the side edges of adjacent segments abut over a first portion of their length adjacent to said points and diverge from each other over a second portion of their length remote from said points; and securing said abutting portions of said segments to each other.

12. A method as in claim 11 in which said providing step comprises cutting said segments from fabric.

13. A method as in claim 11 including the step of impregnating said fabric segments with resin.

14. A method as in claim 11 including the step of conforming said layer to a generally hemispherical shape with the side edges of adjacent segments in abutting relationship over substantially their entire length.

15. A method as in claim 11 including the steps of conforming said layer to a generally hemispherical shape with the side edges of adjacent segments in abutting relationship over substantially their entire length and compression molding said conformed layer.

16. A method as in claim 11 in which said layer is a first layer, said method including the steps of forming a second layer in the same manner as said first layer and inserting said second layer within said first layer with the side edges of the segments of said first layer out of alignment with the side edges of the segments of said second layer.

* * * * *